United States Patent Office 3,257,890
Patented June 28, 1966

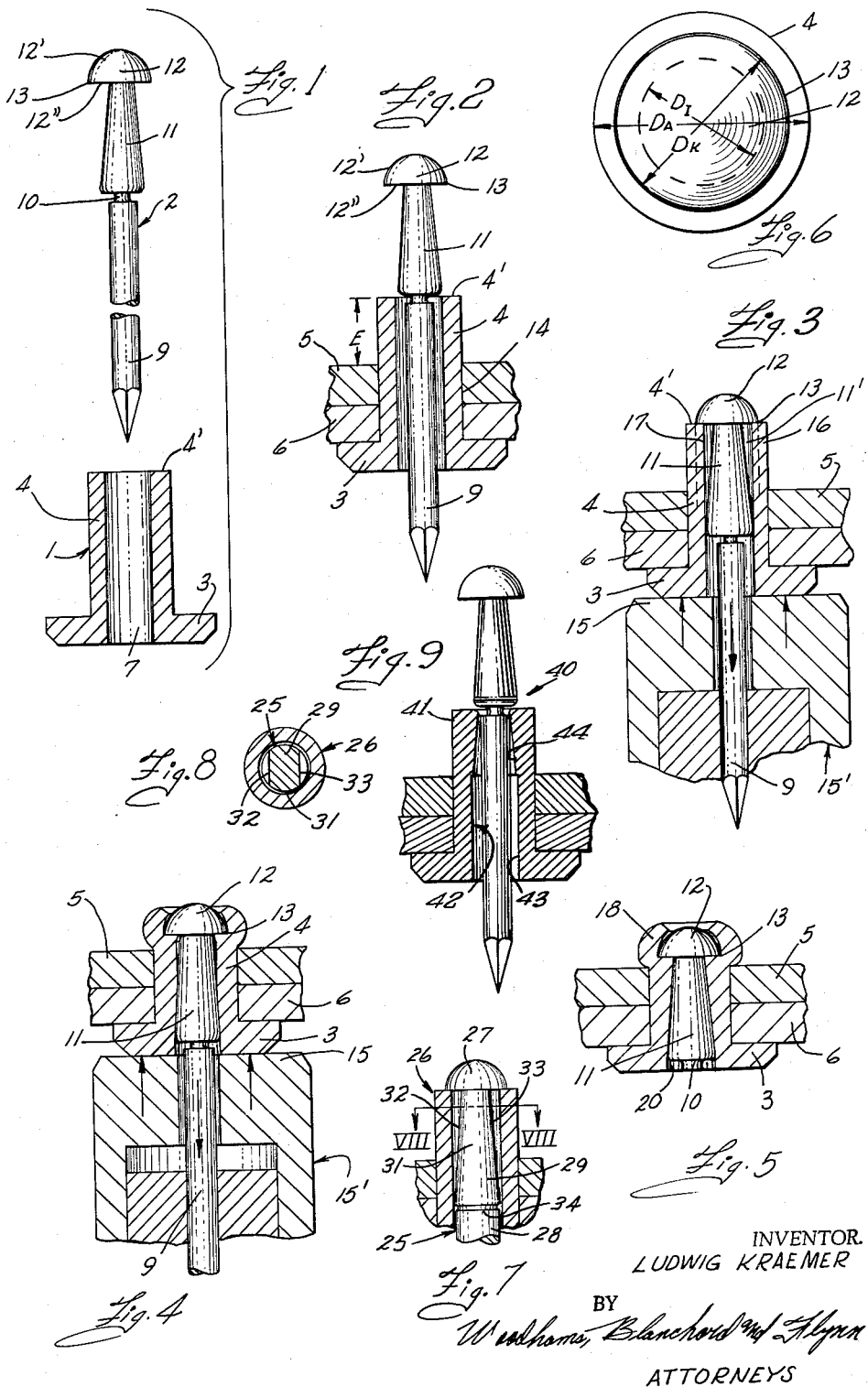

3,257,890
BLIND RIVETED JOINT
Ludwig Kraemer, Seestrasse 6, Offenbach, Germany
Filed Dec. 18, 1964, Ser. No. 419,500
Claims priority, application Austria, Aug. 12, 1958,
A 5,645/58
3 Claims. (Cl. 85—72)

This application is a continuation-in-part of application Serial No. 832,393, filed August 7, 1959 and now abandoned.

The present invention relates to a blind rivet, a blind riveted joint or connection and to a method for effecting the blind riveting and forming the blind rivet.

A blind riveted joint is used in those cases in which one side of the rivet joint is not accessible, so that the complete riveting process must be executed from the other side. Such cases are very frequent, e.g., in the constrution of vehicles or in the construction of aeroplanes. The blind rivet joint may consist of a hollow rivet and a draw-in mandrel. The hollow rivet has on its one extremity a set head and on its other extremity a rivet shaft, which is formed to a rivet head during the riveting process. The draw-in mandrel is provided on one extremity with a head, the diameter of which must not be larger than the diameter of the hole in the parts to be connceted, e.g., sheet metals.

In executing the blind riveting, the draw-in mandrel is inserted first into the hollow rivet in such a way that the head of the mandrel engages the free end of the rivet shaft and the free mandrel end protrudes from the set head of the hollow rivet. Thereafter, the free mandrel end is grasped by means of riveting pincers, the mouth piece of which reproses opposite to the set head of the hollow rivet. Now the hollow rivet is inserted with the mandrel in it from the accessible side into the hole of the sheet metals to be connected until the set head engages the outer sheet metal. Thereafter, the mandrel is drawn, by means of the pincers engaging the set head, through the hollow rivet for a certain distance and during this process the extremity of the rivet shaft is transformed to a rivet head. At the end of this process, either the mandrel breaks, if it is provided with a notch as a predetermined breaking point, or it is simply nipped off. The head of the mandrel and the head shaft extending from it remain in the rivet connection.

The prior art has disclosed a construction in which the underside of the mandrel head fully radially covers the free end of the hollow shaft prior to formation of the rivet head. In forming the rivet head in the prior art disclosure, the axial pressure of the mandrel head flattens a substantial part of the short, projecting end of the hollow shaft against the adjacent sheet metal, whereby said part of the shaft end flows substantially only radially outwardly with respect to the mandrel head and the side and top surfaces of the mandrel head are thus left substantially completely exposed. The prior art method disadvantageously requires a large force for the in-drawing of the mandrel head against the rivet shaft since it causes all of the material of the projecting shaft end to flow either radially or into the annular zone between the rivet and the mandrel. Moreover, the head of the mandrel remains uncovered after the rivet is completed.

An object of this invention is to provide a blind riveted joint in which the hollow rivet and the mandrel form, after the riveting, a rigid unit filling the hole in the sheet metals connected thereby and pressing them together, which rivet unit has about the same shearing resistance as a full or solid rivet.

A further object of the invention is to provide a blind riveted joint in which the rivet shaft tightly and continuously grips the mandrel and in which part of the shaft end covers at least the major part of the side and top of the mandrel head for firmly holding the mandrel in position.

A further object of the invention is to form a watertight blind riveted joint.

A further object of the invention is to provide a blind riveted joint to be obtained with a relatively small effort.

A further object of the invention is to form the parts of the blind riveted joint in such a way that they can be manufactured in an inexpensive way.

A further object of the invention is to provide a method of forming a blind riveted joint, as aforesaid, in which the mandrel head has a cutting edge along its lower edge whereby the radially inner portion of the rivet shaft end is cut off and urged into the zone between the shaft and the mandrel, and the radially outer portion of said shaft end is deflected to conform to the side and upper surfaces of the mandrel head, thereby to minimize the amount of plastic deformation and hence pulling force required for the in-drawing movement of said mandrel along the rivet shaft.

Other objects and advantages will be apparent from a consideration of the specification and claims.

FIGURE 1 is a vertical section through the blind riveted joint, where in the parts are separated.

FIGURE 2 is a view similar to FIGURE 1, wherein the parts of the blind riveted joint are assembled with sheet materials.

FIGURE 3 is a view similar to FIGURE 1, showing the first step to make the rivet joint.

FIGURE 4 is a view similar to FIGURE 1, showing the second step for making the rivet head.

FIGURE 5 is a view similar to FIGURE 1 and showing the finished riveted joint.

FIGURE 6 is an enlarged view taken from the top of FIGURE 3.

FIGURE 7 is a sectional view similar to FIGURE 3 and showing an alternate mandrel.

FIGURE 8 is a sectional view taken along the line VIII—VIII in FIGURE 7.

FIGURE 9 is a sectional view of a modified blind rivet joint in a partially assembled condition.

For convenience in the description, the terms "upper," "lower" and words of similar import will have reference to the device of the invention as appearing in FIGURE 3. The words "interior" and "exterior" will refer to the remote sides of the sheets held together by the rivet construction, the exterior side being at the lower end in FIGURE 5. The words "inner" and "outer" and derivatives thereof will have reference to the geometric center of the rivet and designated parts thereof.

As shown in FIGURE 1, the blind rivet consists of a rivet shell or hollow rivet 1 and a drawn-in mandrel 2. The hollow rivet 1 has an annular flange or set head 3 and a rivet shaft 4 extending from the set head 3 and terminating in a free end 4'. Shaft 4 is provided with a preferably cylindrical bore 7. If desired, the upper end of the bore 7 may be tapered somewhat so that it converges towards the free end of shaft 4. However, this is not required within the broader aspects of the invention.

The draw-in mandrel 2 consists of a draw shaft 9, a conical head shaft 11, linked to shaft 9 by a predetermined breaking zone 10, and a button head 12. The breaking zone 10 is preferably of substantially less tensile strength than the remainder of the mandrel 2 and may be constructed by any convenient means. In one preferred embodiment, the breaking zone 10 is formed by an annular groove or portion of reduced diameter. The conical shape of the head shaft 11 is chosen in such a way that it converges towards the button head 12. The largest diameter of the conical head shaft preferably corresponds to the diameter of the cylindrical bore 7 in the hollow rivet 1.

The button head 12 is preferably shaped substantially as a hemisphere with a convex upper or interior face 12′ and a preferably radial lower face 12″. The upper side 12′ of the button head 12 forms with the lower side 12″ an annular cutting edge or ring cutter 13, the diameter of which is clearly different from and lies between the outside and inside diameters of the hollow rivet shaft 4 at the free end thereof. It has been found most effective in practice to provide a button head 12 which covers approximately between 55% and 70% of the upper, annular surface of the free end of the rivet shaft 4, thereby leaving exposed the radially outermost portion, or from about 30% to 45% of the total surface. Thus, the portion of the rivet shaft 4 which is axially aligned with the button head 12 defines the upper end of an inner annular zone 17 (FIGURE 3) and the portion of the rivet shaft 4 which lies radially outwardly of the button head 12 defines the upper end of an outer annular zone 16. At least in effect, the zones 16 and 17 define integral, inner and outer shells at the upper end of the rivet shaft 4. Typical values of the diameter of the button head 12 and the inside and outside diameters of the rivet shaft 4 are found in Table I hereinbelow.

TABLE I

| $D_A$(mm.) | $D_I$(mm.) | $D_K$(mm.) | $F_A/F_G$ (percent) | $F_I/F_G$ (percent) |
|---|---|---|---|---|
| 5 | 3 | 4.3 | 41 | 59 |
| 4 | 2.6 | 3.6 | 32 | 68 |
| 3 | 1.8 | 2.6 | 37 | 63 | in which:

$D_A$ is the outer diameter of the hollow rivet shaft 4 in millimeters.

$D_I$ is the inner diameter of the hollow rivet shaft 4 in millimeters.

$D_K$ is the outer edge diameter of the head 12 in millimeters.

$F_G$ is the total annular free end surface of the rivet shaft, i.e., $$\pi = \left(\frac{D_A^2 - D_I^2}{4}\right)$$

$F_A$ is the free end surface area of the outer zone 16, i.e., $$\pi = \left(\frac{D_A^2 - D_K^2}{4}\right)$$

$F_I$ is the free end surface area of the inner zone 17, i.e., $$\pi = \left(\frac{D_K^2 - D_I^2}{4}\right)$$

Thus, it will be seen that the cutting ring 13 is clearly of smaller diameter than the outer diameter of the rivet shaft 4 and is clearly of larger diameter than the inside diameter of the rivet shaft 4. Moreover, in terms of the total surface $F_G$, which is involved, these differences in diameters and in areas are of real significance, particularly when viewed in the light of the results which they produce.

The distance E (FIGURE 2) by which the length of the hollow shaft 4 of a hollow rivet advantageously exceeds the thickness of the riveted materials 5 and 6 is indicated for several diameters $D_A$ hereinbelow in Table II.

TABLE II

| $D_A$(mm.) | E(mm.) |
|---|---|
| 5 | 3 to 5 |
| 4 | 2.5 to 3.5 |
| 3 | 2 to 4 |

It will be noted from FIGURES 2 and 3 that the axial extent of the button head 12 is substantially less than the length E of initial extension of the rivet shaft 4 beyond the sheets 5 and 6. The diameter of the draw shaft 9 of the mandrel 2 is less than the diameter of the cylindrical bore 8 in the hollow rivet 1. The length of the head shaft 11 of the mandrel 2 is about equal to the thickness of the two metal sheets plus the thickness of the set head 3. As to materials for the hollow rivet, there may be utilized, for example, an aluminum magnesium alloy, an 80% copper and 20% nickel alloy, or copper, as well as a wide variety of other materials. The mandrel preferably consists of steel, although other materials may be found suitable.

In riveting, the following method is used:

First, the hollow rivet 1 with the mandrel 2 fully inserted in it, as in FIGURE 3, is inserted into the perforation 14 provided in the sheet metals 5 and 6. Usually, the blind rivet is supplied in its assembled condition of FIGURE 3 to the user. Thereafter, the draw shaft 9 of the mandrel 2 is gripped by means of pincers 15′ of known configuration. The draw shaft 9 can be gripped by the pincers before the unit is inserted in the opening 14. The head 15 of the pincers is pressed in the direction of the arrows against the set head 3 of the hollow rivet 1 while the mandrel 2 is moved in the direction of the arrow thereon. At the beginning of the movement, the draw shaft 9 of the mandrel 2 is pulled by the pincers 15′ to move the button head 12 into firm contact with the free end of the rivet shaft 4. At this point, the interior end of the hollow shaft 4 will normally extend beyond the interior surface of the sheet 5 a distance substantially greater than, such as about twice, the axial length of the head 12.

An increased pulling force is then applied to the draw shaft 9 which causes the ring cutter 13 to cut into the free end 4′ and thereby separate, as by peeling or shearing, the material within the inner zone 17 from the outer zone 16 of the shaft 4. This inner material is moved by the underside 12″ of the mandrel head 12 downwardly along the material in the outer zone 16, as indicated in FIGURE 4, axially along the shaft 4 toward and into the annular space 11′ (FIGURE 3) between the shaft 4 and the head shaft 11.

Due to the compressive force applied to the inner zone 17 of the shaft material by the mandrel head 12, the material in the outer zone 16 of the hollow shaft 4 is caused to bulge outwardly past the periphery of the hole 14 as the head 12 moves toward the sheet 5. The friction and compressive force created by the head 12 also applies a bending moment to the outer shell 16 around the cutting edge 13 whereby the interior end of said shell 16 is urged radially inwardly and tends to follow the contour of the side and top surfaces of the head 12. Thus, when the head 12 reaches its terminal position of FIGURE 5, the outer shell 16 at least partially surrounds the button head 12. That is, the interior end of the shell 16 forms an annular hood or rivet head 18 substantially surrounding and at least partially in contact with the upper surface 12′ of the button head 12 except, in the present embodiment, for a relatively small area in the center thereof.

As the button head 12 nears the sheet 5, the outward bulge formed thereby in the outer shell 16 of the hollow shaft 4, is urged against the interior side of the sheet 5, the presence of which effectively terminates further movement of the mandrel 2 in the exterior direction and prevents exterior movement of said hollow shaft 4 with respect to the sheets 5 and 6. In this manner there is formed a rivet head 18 which, by substantially surrounding the head 12 of the mandrel 2, cooperates with the material in the space 11′ to prevent interior movement of the mandrel 2.

The rivet shaft 4 will expand into snug contact with the walls defining the hole 14 as the head 12 moves through the shaft 4. This expansion may start with the initial pressure of the button head 12 against the free end of the rivet shaft, but may be primarily effected during the final stage of button head movement. During this final stage, material of the inner zone 17 is forced to flow into and substantially fill the space 11' between the shaft 4 and the conical head shaft 11 so as to grip the head shaft 11 tightly and continuously above the zone 10 and below the surface 12" of the button head 12. Since only the material of the inner zone 17 of the interior end of the hollow shaft 4 undergoes significant flow, the material of the outer zone being primarily subjected to bending, the pulling force required is noticeably smaller than would be required if the entire interior end of the hollow shaft 4 were compressed. In fact, it is believed that about twice as much force would be required. Thus, the hollow rivet forms a rigid unit comprising the head 12, the head shaft 11, the set head 3 and the shaft 4 whereby the sheets 5 and 6 are pressed together with great force between the set head 3 and the rivet head 18.

At the end of this phase of the rivet forming, the resistance against further exterior movement of the mandrel becomes so great that the mandrel breaks at the predetermined breaking zone 10. The predetermined breaking zone 10 can be arranged, according to the requirements, such as the form of the set head, so that the break is flush with the set head or projects beyond the set head or is even recessed therewithin. If recessed, the hollow space 20 (FIGURE 5) can be filled in with a known paste in order to avoid corrosion.

It may be mentioned that the button head 12 need not have in every case the form of a hemispherical head. However, it was shown in practice that the material of the outer zone 16 surrounds such a form particularly snugly. It is also possible to keep the greatest diameter of the conical head shaft 11 somewhat larger than the diameter of the cylindrical bore 7 in the hollow rivet 1 so that, during the drawing in of the mandrel 2, a widening of the bore 7 takes place. In such case, the unit would preferably be inserted in the openings 14 in the sheets 5 and 6 with the mandrel 2 and rivet 1 in their FIGURE 2 positions.

It is possible to provide at the end of the riveting process a different method to make the mandrel shorter, e.g., by nipping off or the like instead of a breaking of the mandrel at a weakened or breaking zone 10. It is also possible to arrange the predetermined breaking zone so far towards the outside that the bore of the hollow rivet is filled in fully by the head shaft. If the exterior end of the head shaft projects beyond the set head, it can easily be ground off.

FIGURES 7 and 8 illustrate an alternate mandrel 25 for a blind rivet 26 which embodies the invention and may otherwise be identical with the blind rivet shown in FIGURE 2. The mandrel 25 has a button head 27 and draw shaft 28 which may be like the button head 12 and draw shaft 9. However, the head shaft 29 has a uniform, diametrical dimension lengthwise thereof along at least part of its circumferential surface 31, as shown in FIGURE 8. Also, two opposite parts 32 and 33 of said surface 31 are flattened and tapered so that they converge toward the button head 27. In this case, it may be advantageous to provide a draw shaft 28 having about the same diameter as the adjacent portion of the head shaft 29 and separated therefrom by a weakened zone, such as the groove 34.

The modified riveted joint 40 (FIGURE 9) may be identical with the joint shown in FIGURE 2 except that the rivet shell 41 of joint 40 has a particular type of opening 42 therethrough. That is, the opening 42 has a cylindrical portion 43 adjacent its exterior end and a conical portion 44 adjacent its interior end. The conical portion 44 is of smaller diameter than, and converges away from, the cylindrical portion 43.

According to the invention, a vibration-proof and tight blind riveted joint is obtained by the use of relatively small forces, the rivet having a shearing resistance which corresponds to that of a solid rivet. In spite of this, the hollow rivet and the mandrel have a simple form which can be manufactured very economically, e.g., by stamping, a fact which is very important for such articles produced in great quantities.

Although a particular preferred embodiment of the invention has been disclosed above in detail for illustrative purposes, it will be recognized that variations or modifications of such disclosure, which come within the scope of the appended claims, are fully contemplated.

The embodiments of the invention in which an exclusive property or privilege is claimed are defined as follows:

1. A blind rivet construction for joining a plurality of parts having aligned openings therethrough, comprising: a hollow cylindrical rivet having a coaxial cylindrical bore, an annular generally planar end surface at one end thereof and an annular, outwardly extending flange at the other end thereof, said rivet being snugly and slideably receivable through said openings in said parts, the length of said rivet exceeding the thickness of said flange and said parts adjacent said openings by a predetermined increment; a draw-in mandrel having a draw shaft, a head shaft coaxial with said draw shaft, and a separation zone joining one end of said head shaft to said draw shaft, said mandrel being slideably receivable into said bore with said head shaft disposed within said rivet, said separation zone being no stronger than the rest of said mandrel so as to fracture when a strong transaxial force is applied thereto; and a mandrel head coaxial with and connected to the other end of said head shaft, said increment substantially exceeding the axial extent of said mandrel head, said mandrel head having a generally planar surface facing the rivet and a head surface which joins said generally planar surface at an angle not materially exceeding said 90 degrees to define a coaxial annular cutting edge adjacent said head shaft and engageable with said end surface of said rivet, said head shaft being tapered to converge toward said head to define with said bore a metal fill-in zone therebetween, said mandrel head covering an annular inner zone on said annular end surface which has an area substantially in the range of 55% to 70% of the total area of said annular end surface, said inner zone being surrounded by an outer annular zone not covered by said mandrel head and having an area substantially in the range of 30% to 45% of the total annular end surface area, said areas being measured as projected upon a plane substantially perpendicular to the axis of said mandrel so that movement of said mandrel head toward said annular flange causes said cutting edge to shear an inner cylindrical portion of said increment from an outer cylindrical portion of said increment and urges said inner portion into said fill-in zone, and at the same time bends said outer portion of said increment radially inwardly around said mandrel head so that it covers a major portion of said mandrel head, a part of said outer portion being urged radially outwardly beyond the edge of the opening in the one of said parts adjacent thereto.

2. A blind rivet construction comprising a hollow rivet having a cylindrical bore portion, a conical bore portion and a substantially radially disposed, annular end surface; a draw-in mandrel having a draw shaft portion of smaller diameter than the minimum bore diameter of said hollow rivet and a head shaft portion with a head at the free end thereof said head having a substantially radially extending surface facing the rivet and a head surface which joins said facing surface at an angle not materially exceeding 90 degrees to form an annular cutting edge adjacent said head shaft portion, said head shaft portion being of conical shape and converging toward said head to define a metal fill-in zone, said rivet conical bore portion tapering to a minimum diameter at the end of said rivet adjacent said head, and the end of said head shaft conical portion remote from said head being of greater diameter than the minimum bore diameter of said conical bore portion, said annular cutting edge being of larger diameter than the minimum bore diameter of said hollow rivet and smaller than the maximum outside diameter of said rivet, said mandrel head covering an annular inner zone on said annular end surface which has an area substantially in the range of 55% to 70% of the total area of said annular end surface, said inner zone being surrounded by an outer annular zone not covered by said mandrel head and having an area substantially in the range of 30% to 45% of the total annular end surface area, said areas being measured as projected upon a plane substantially perpendicular to the axis of said mandrel so that said cutting edge is effective to cut away an inner portion of the wall of said rivet and displace the metal into said fill-in zone during drawing in of said draw-in mandrel, and to effect closing of the wall at the end of the hollow rivet around the head and to deform said wall outwardly at this location to tightly clamp the materials being riveted.

3. A blind rivet construction for joining a plurality of parts having aligned openings therethrough, comprising: a hollow cylindrical rivet having a coaxial cylindrical bore, an annular, generally radially extending end surface at one end thereof and an annular, outwardly extending flange at the other end thereof, said rivet being snugly and slideably receivable through said openings in said parts, the length of said rivet exceeding the thickness of said flange and said parts adjacent said openings by a predetermined increment; a draw-in mandrel having a draw shaft, a head shaft coaxial with said draw shaft, and a separation zone joining one end of said head shaft to said draw shaft, said mandrel being slideably receivable into said bore with said head shaft disposed within said rivet, said separation zone being capable of fracture when a transaxial force is applied thereto; and a mandrel head coaxial with and connected to the other end of said head shaft, said increment substantially exceeding the axial extent of said mandrel head, said mandrel head having a substantially radially extending surface facing the rivet and a head surface which joins said facing surface at an angle not materially exceeding 90 degrees to define a coaxial annular cutting edge adjacent said head shaft and engageable with said end surface of said rivet, said head shaft being tapered to converge toward said head to define with said bore a metal fill-in zone therebetween, said mandrel head covering an annular inner zone on said annular end surface which has an area substantially in the range of 55% to 70% of the total area of said annular end surface, said inner zone being surrounded by an outer annular zone not covered by said mandrel head and having an area substantially in the range of 30% to 45% of the total annular end surface area, said areas being measured as projected upon a plane substantially perpendicularly to the axis of said mandrel, so that movement of said mandrel head toward said annular flange causes said cutting edge to shear an inner cylindrical portion of said increment from an outer cylindrical portion of said increment and urges said inner portion into said fill-in zone, and at the same time bends said outer potrion of said increment radially inwardly around said mandrel head so that it covers a major portion of said mandrel head, a part of said outer portion being urged radially outwardly beyond the edge of the opening in the one of said parts adjacent thereto.

References Cited by the Examiner
UNITED STATES PATENTS 2,787,932   4/1957   Morton _____ 85—70

FOREIGN PATENTS 1,182,586   1/1959   France.
602,652   5/1948   Great Britain.
625,331   6/1949   Great Britain.
854,828   11/1960   Great Britain.

EDWARD C. ALLEN, *Primary Examiner.*